United States Patent
Sadek et al.

(10) Patent No.: US 8,675,623 B2
(45) Date of Patent: Mar. 18, 2014

(54) DISTRIBUTED PRIORITIZED CONTENTION FOR SPECTRUM SHARING

(75) Inventors: Ahmed K. Sadek, San Diego, CA (US); Stephen J. Shellhammer, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 466 days.

(21) Appl. No.: 12/688,740

(22) Filed: Jan. 15, 2010

(65) Prior Publication Data

US 2010/0195572 A1   Aug. 5, 2010

Related U.S. Application Data

(60) Provisional application No. 61/148,968, filed on Feb. 1, 2009.

(51) Int. Cl.
*H04W 4/00*   (2009.01)
*H04L 12/413*   (2006.01)
*H04J 3/02*   (2006.01)

(52) U.S. Cl.
USPC ........... 370/338; 370/445; 370/447; 370/448; 370/461; 370/462

(58) Field of Classification Search
USPC ................... 370/461–462, 44–450
See application file for complete search history.

(56) References Cited

U.S. PATENT DOCUMENTS

| | | | | |
|---|---|---|---|---|
| 5,968,154 A | * | 10/1999 | Cho | 710/119 |
| 6,111,888 A | * | 8/2000 | Green et al. | 370/461 |
| 6,614,799 B1 | * | 9/2003 | Gummalla et al. | 370/448 |
| 6,807,189 B1 | * | 10/2004 | Fischer | 370/447 |
| 7,352,770 B1 | * | 4/2008 | Yonge et al. | 370/445 |
| 7,428,240 B2 | * | 9/2008 | Jang et al. | 370/447 |

(Continued)

FOREIGN PATENT DOCUMENTS

| | | | |
|---|---|---|---|
| JP | 2002374264 A | 12/2002 | |
| JP | 2005167707 A | 6/2005 | |
| WO | 2007081503 A1 | 7/2007 | |

OTHER PUBLICATIONS

Ahmed Sadek, Steve Shellhammer: Distributed Prioritized on Demand Contention—IEEE P802.22 Wireless RANs, Qualcomm IEEE 802.22 Draft Standard for Wireless Regional Area Networks (WRAN)—Specific requirements—Part 22: Cognitive Wireless RAN Medium Access Control (MAC) and Physical Layer (PHY) specifications: Policies and procedures for operation in the TV Bands, No. IEEE 802.22-08/0200r0 Jul. 14, 2008, pp. 1-13, XP002628083, Retrieved from the Internet: URL:https://mentor.1eee.org/802.22/dcn/08/  22/08/0200-00/0000-distributed-prioritized-on-demand-content i on.ppt [retrieved on Mar. 14, 2011].

(Continued)

*Primary Examiner* — Candal Elpenord
(74) *Attorney, Agent, or Firm* — Stanton Braden

(57) ABSTRACT

Techniques for use in contending for a portion of a television channel spectrum are disclosed. In some instances, a back-off value is used to decide whether a contender's contention number will be transmitted when the contention channel is free, and the back-off value is determined based on the contention number. In some instances, a contender monitors the contention channel and withdraws from contention if it detects from the contention channel that a higher priority contender is in contention.

14 Claims, 5 Drawing Sheets

(56) References Cited

U.S. PATENT DOCUMENTS

| | | | | |
|---|---|---|---|---|
| 7,944,940 | B2* | 5/2011 | Ma et al. | 370/447 |
| 8,045,574 | B2* | 10/2011 | Sherman et al. | 370/445 |
| 8,098,966 | B2* | 1/2012 | Bayindir et al. | 385/12 |
| 8,160,090 | B2* | 4/2012 | Yoshizawa et al. | 370/450 |
| 2003/0083095 | A1* | 5/2003 | Liang | 455/552 |
| 2006/0034199 | A1* | 2/2006 | Chu et al. | 370/310 |
| 2009/0180492 | A1* | 7/2009 | Hu | 370/462 |
| 2009/0186573 | A1* | 7/2009 | Pernu et al. | 455/26.1 |
| 2009/0213815 | A1* | 8/2009 | Sherman et al. | 370/336 |
| 2010/0195664 | A1* | 8/2010 | Ho | 370/445 |

OTHER PUBLICATIONS

Andreas Willig: "Recent and Emerging Topics in Wireless Industrial Communications: A Selection", IEEE Transactions on Industrial Informatics, IEEE Service Center, New York, NY, US, vol. 4, No. 2, May 1, 2008, pp. 102-124, XP011215124 ISSN: 1551-3203.

Hang Su, et al., "CREAM-MAC: An efficient Cognitive Radio-enabled Multi-Channel MAC protocol for wireless networks", World of Wireless, Mobile and Multimedia Networks, 2008, WOWMOM, 2008 International Symposium on a, IEEE, Piscataway, NJ, USA, Jun. 23, 2008, pp. 1-8, XP031302781, ISBN: 978-1-4244-2099-5.

International Search Report and Written Opinion—PCT/US2010/022681, ISA/EPO—Apr. 20, 2011.

Stevenson C, et al., "IEEE 802.22: The first cognitive radio wireless regional area network standard", IEEE Communications Magazine, IEEE Service Center, Piscataway, US, vol. 47, No. 1, Jan. 1, 2009, pp. 130-138, XP011280623, ISSN: 0163-6804, DOI: 10.1109/MCOM.2009.4752688.

Wendong Hu, et al., "Efficient , flexible, and scalable inter-network spectrum sharing and communications in cognitive IEEE 802.22 networks", Cognitive Radio and Advanced Spectrum Management, 2008, Cogart 2008, First International Workshop on, IEEE, Piscataway, NJ, USA, Feb. 14, 2008, pp. 1-5, XP031247474, ISBN: 978-1-4244-2139-8.

Yuan Yuan, et al., "Knows: Cognitive Radio Networks Over White Spaces", New Frontiers in Dynamic Spectrum Access Networks, Dyspan 2007, 2nd IEEE International Symposium on, IEEE, PI, Apr. 1, 2007, pp. 416-427, XP031095648, DOI:10.1109/DYSPAN.2007.61 ISBN: 978-1-4244-0663-0.

Taiwan Search Report—TW099102864—TIPO—May 28, 2013.

* cited by examiner

US 8,675,623 B2

DISTRIBUTED PRIORITIZED CONTENTION FOR SPECTRUM SHARING

CLAIM OF PRIORITY UNDER 35 U.S.C. §119

The present Application for Patent claims priority to Provisional Application No. 61/148,968 entitled "Distributed Prioritized Contention for Spectrum Sharing" filed Feb. 1, 2009, and assigned to the assignee hereof and hereby expressly incorporated by reference herein.

BACKGROUND

1. Field

The present work relates generally to wireless communications and, more particularly, to contention for access to portions of a wireless communication spectrum.

2. Background

The four documents identified below are incorporated herein by reference. They are referred to herein by the corresponding bracketed numerals below.

[1] Federal Communications Commission Spectrum Policy Task Force, 'Report of the Spectrum Efficiency Group', Technical Report 02-135.
[2] Federal Communication Commission, Second Report and Order on Unlicensed Operation in the TV Broadcast Bands, November 2008, FCC 08-260.
[3] Shared Spectrum Company, "Comprehensive Spectrum Occupancy Measurements Over Six Different Locations", August 2005.
[4] Draft Standard for Wireless Regional Area Networks Part 22, IEEE P802.22™/DRAFTv2.0., May 2009

One of the major limitations facing the continuous increase in demands for higher data rate services and future wireless applications is the scarcity of spectrum. On the other hand measurements studies conducted by the FCC and industry [1, 2] show light utilization of the spectrum at any given time or location. This is especially true for the TV spectrum, a high percentage of which is under utilized, or what is referred to as the White Space.

One solution to increase the efficiency of utilizing this spectrum and provide a solution for the spectrum scarcity is opportunistic usage of the under utilized spectrum without causing interference to the spectrum primary users or incumbents. In order to encourage unlicensed use of the spectrum, the FCC, through a Notice of Proposed Rule Making (FCC NPRM) is considering opening up the spectrum allocated to TV broadcast services for unlicensed use by secondary devices operating on a non-interference basis with the incumbent users (TV broadcasters). The IEEE has also set up a working group (802.22 WG), which is drafting an emerging standard for opportunistic broadband data communication over Wireless Regional Area Networks (WRANs) utilizing cognitive radio technologies in the TV frequency spectrum [3]. The term 'cognitive radio' can be thought of as encompassing several techniques that seek to overcome the spectral shortage problem by enabling secondary (unlicensed) wireless devices to communicate without interfering with the primary users. Cognitive communication faces a multitude of hurdles in spectrum access and spectrum sharing. A spectrum sharing protocol is a technique to enable reliable operation of two or more systems sharing the same spectrum. Therefore a spectrum sharing protocol is essentially an interference management scheme between different systems.

Spectrum sharing techniques fall into different categories based on the level of information and cooperation between the different secondary systems. In particular, spectrum sharing can be categorized into three broad approaches:

(1) The networks operate independently trying to access the medium, or in other words use non-cooperative approaches;
(2) The networks agree on a set of rules that do not require interoperability, for example listen-before-talk; and
(3) A common message approach in which different systems can utilize a common control channel to exchange information related to sharing the spectrum, which requires a level of interoperability between systems.

The IEEE 802.22 [4] system specifies a fixed wireless regional area network (WRAN) in which a base station (BS) manages a group of fixed customer premise equipments (CPEs) as depicted in FIG. 1. The IEEE 802.22 draft standard [4] describes a message based approach for self-coexistence among 802.22 WRANs. The draft standard defines a Coexistence Beacon Protocol (CBP) in which the CPEs and BSs are allowed to transmit coexistence information during a predefined coexistence window, namely a self-coexistence window (SCW), which is a specified duration of time in the UL (uplink) sub-frame. This is illustrated by the timing diagram of FIG. 2, wherein TTG is the Transmit/Receive Transition Guard, and RTG is the Receive/Transmit Transition Guard. The coexistence beacons are transmitted in the SCW either by the BS or the CPE and can carry information about the bandwidth allocations of the cell, and hence neighboring cells can implement interference-free scheduling. The BS decides whether the coexistence beacon is transmitted by the BS or one or more of its associated CPEs. The CBP can also carry timestamps for synchronizing BSs, which is required for coexistence.

The CBP enables the WRANs to perform an on demand contention protocol for spectrum sharing [4]. In this protocol, the contention destination (CD) is defined as the WRAN BS currently occupying the channel. The contention sources (CS) are defined as all WRAN BSs that wish to contend to access this channel. In order to decide on the winning CS, the following steps are implemented, as shown in FIG. 3.

Each CS randomly generates a contention number (CN) as shown at 31. The CS's try transmitting their CN's during the SCW (self-coexistence-window) through contention with other CS's, as shown collectively at 32-38. After all CN's are received at the CD, the CD decides that the winning CS is the CS with the largest CN.

The on demand contention protocol of FIG. 3 has disadvantages, some of which include: (1) All CS's have to complete the transmission of the generated CN's and then the CD chooses the CS with the highest CN; (2) There is a large probability of collision due to the probability of different CS's using the same size random back-off window; (3) If there are M CS's, then at least M SCW frames are required to complete the process (typically the number of SCW frames is larger than M, and the algorithm therefore does not scale well); (4) If the winning CS only needs to transmit x frames with x small, then at least M−x frames are wasted until that winning CS acquires the channel.

It is desirable in view of the foregoing to provide for spectrum contention procedures capable of avoiding prior art disadvantages such as described above.

SUMMARY

In some embodiments, a back-off value is used to decide whether a contender's contention number will be transmitted when the contention channel is free, and the back-off value is determined based on the contention number. In some embodiments, a contender monitors the contention channel and withdraws from contention if it detects from the contention channel that a higher priority contender is in contention.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work. The word "exemplary" is used herein to mean "serving as an example, instance, or illustration." Any embodiment described herein as "exemplary" is not necessarily to be construed as preferred or advantageous over other embodiments.

Figure 4:
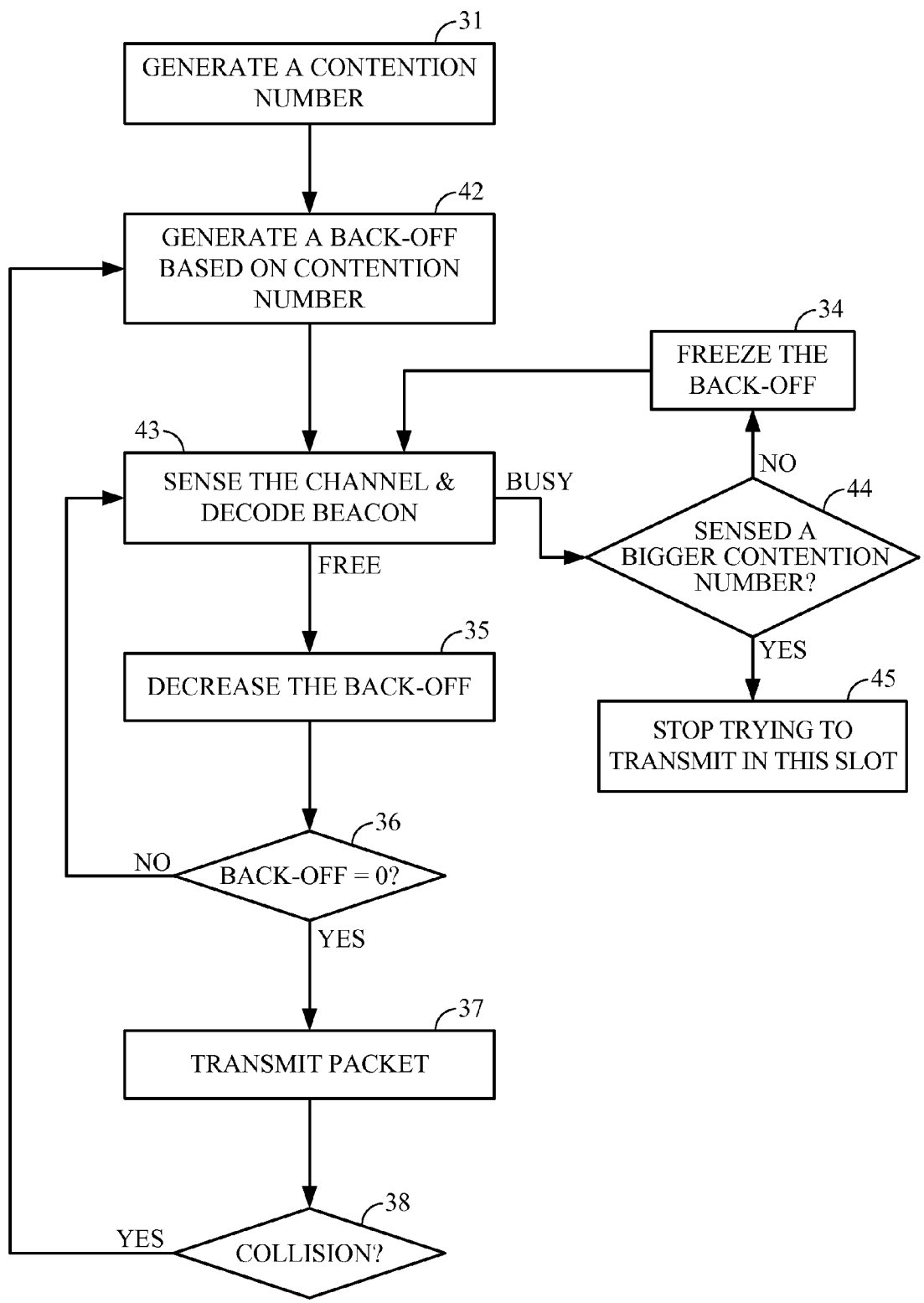
FIG. 4 illustrates operations of a spectrum contention procedure according to exemplary embodiments of the present work.

For secondary systems that use the aforementioned common message approach, example embodiments of the present work provide a distributed prioritized contention protocol for spectrum sharing. The present work reduces the number of contention frames required to decide on the winning WRAN. Some embodiments exploit the following:

Step 1—since the wireless channel is broadcast by nature, if a CS can hear the transmission of another CS, then instead of ignoring the information in that transmission, the CS will decode the transmitted packet (see 43 in FIG. 4). If the CS finds that the CN observed after packet decoding is higher than its own generated CN (see 44 in FIG. 4) it will quit contending for this channel in the current round (see 45 in FIG. 4). This is because even if the CS transmits its CN later, it will definitely lose the contention to the CS with higher CN. The operations at 43-45 in FIG. 4 serve to reduce the number of CS's each frame, which reduces the collision probability in each frame and reduces the total number of contention frames required.

Figure 1:
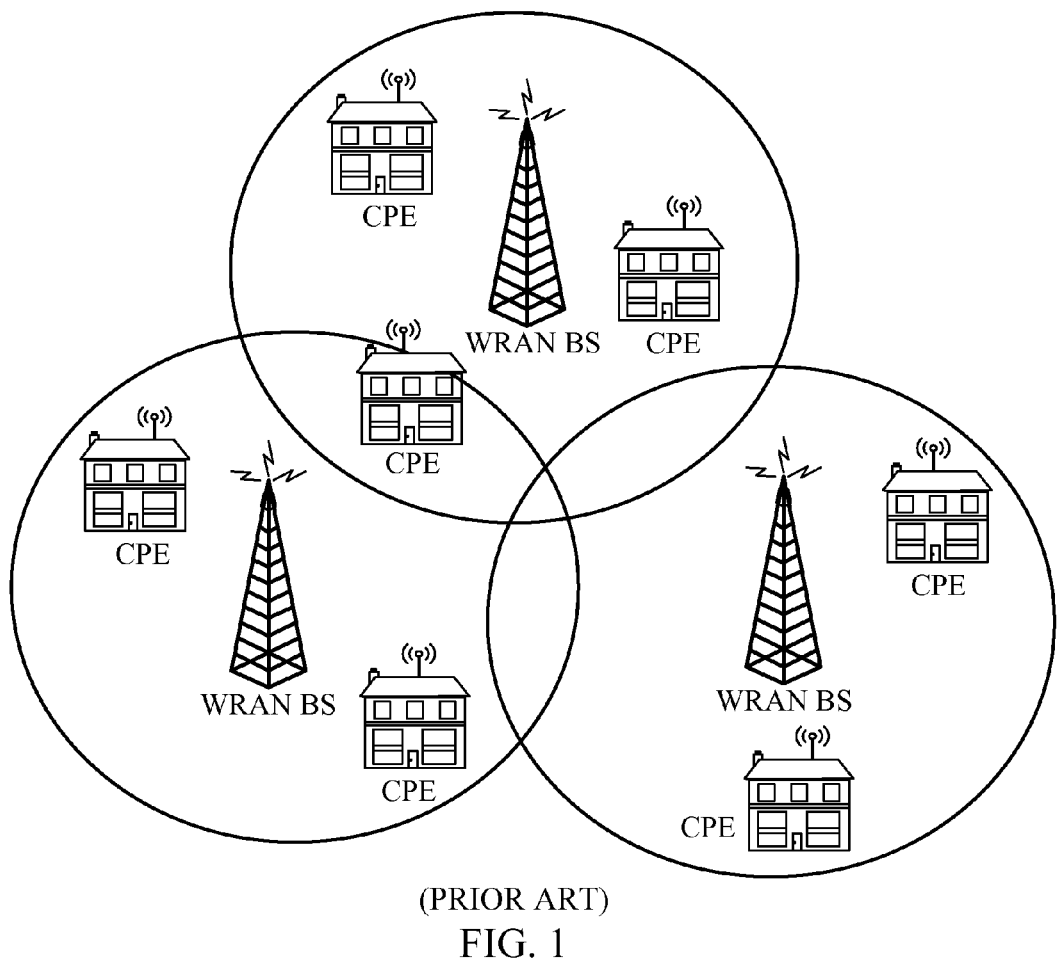
FIG. 1 diagrammatically illustrates a prior art arrangement of WRANs that may contend for white space in the TV spectrum.
Figure 2:
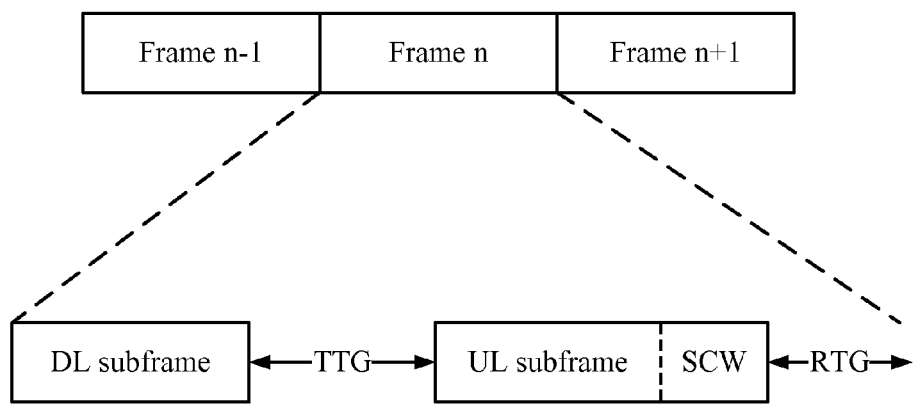
FIG. 2 is a timing diagram showing a self-coexistence window in the UL subframe of a conventional IEEE 802.22 frame.
Figure 3:
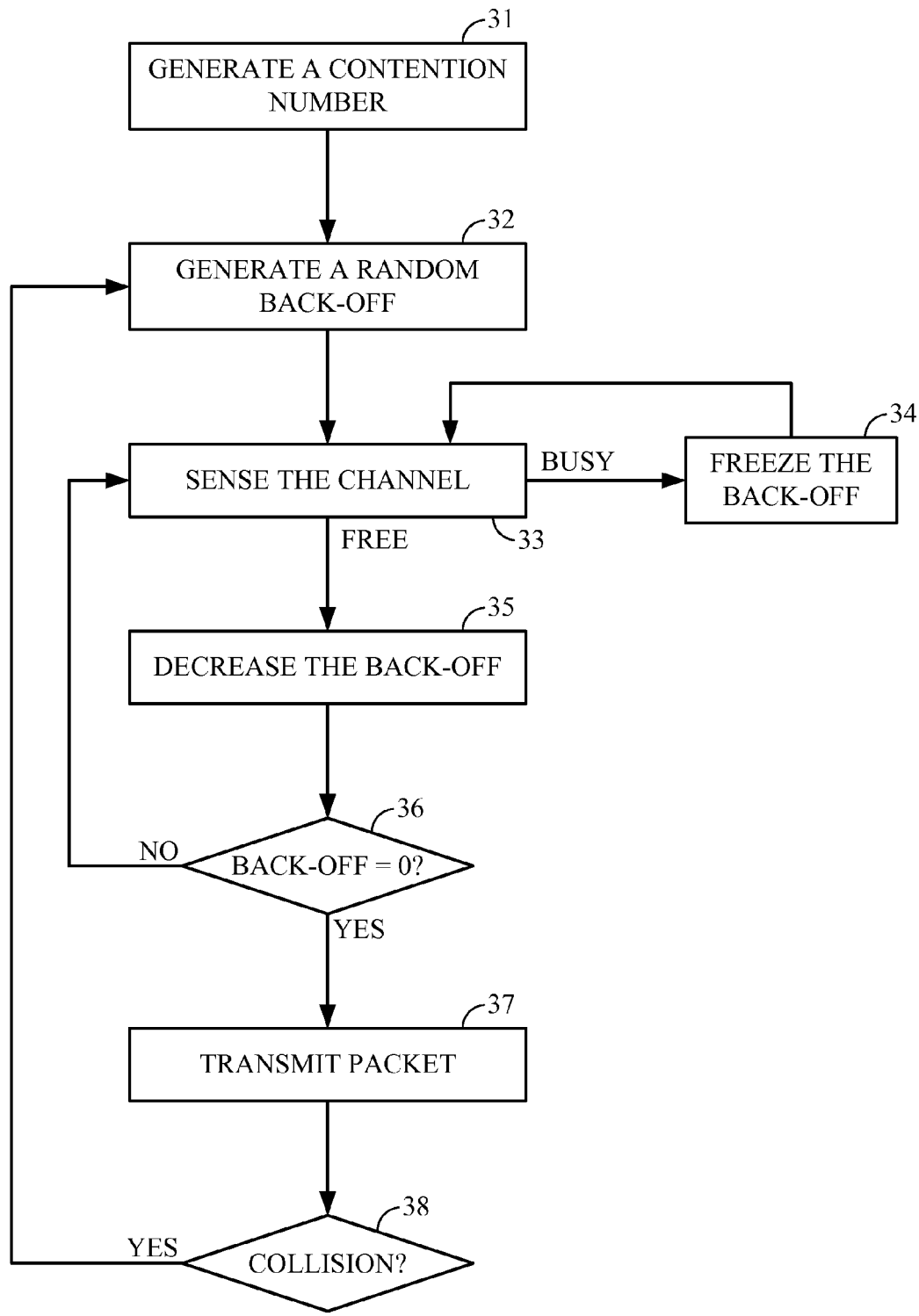
FIG. 3 illustrates operations of a prior art spectrum contention procedure.

Step 2—Based on the above Step 1, an idealized scenario would be if the CS with the largest generated CN transmits first. In this event only one contention frame is required and this achieves the minimum number of contention frames that any protocol could achieve. In prior art approaches such as shown in FIG. 3, the transmission order of the CS's is random, because it is based on randomly generated back-off windows for the CS's. Exemplary embodiments of the present work emulate the idealized scenario described above by determining the size of the random back-off window based on the associated contention number (e.g., inversely related to the contention number). This is shown at 42 in FIG. 2. The following steps explain how the size of the back-off window is designed based on the generated CN in some embodiments. Let $CN_{max}$ be the maximum size of contention number window and $RB_{max}$ the maximum size of random back-off window. For a total of K contending CSs:

For each CS(i) i=1, 2, 3 . . . K:

Generate CN(i)=Uniformly distributed ~{0, 1, . . . , CNmax−1} (see also 31 in FIGS. 3 and 4)

Let $ModRB_{max}=RB_{max}-\text{round}[CN(i)*(RB_{max}-1)/(CN_{max}-1)]$

Generate CSBackoff(i)=Uniformly distributed ~{0, 1, . . . , ModRBmax−1} (see also 42 in FIG. 4)

As set out above, each CS(i) randomly selects its back-off value CSBackoff(i) from a set of back-off values whose maximum is a value $ModRB_{max}$ calculated as a function of the contention number CN(i) associated with CS(i). Larger values of CN(i) produce smaller values of $ModRB_{max}$, and hence smaller values of CSBackoff(i). Smaller values of CSBackoff(i) provide correspondingly higher priorities for transmission of the associated CN(i) (see 34 in FIGS. 3 and 4).

Operation of a protocol according to some embodiments is illustrated by the flow chart in FIG. 4, wherein conventional operations from the adaptive on demand scheme of FIG. 3 are numbered the same as in FIG. 3. The operations in FIG. 4 may be performed by each contention source (CS) according to example embodiments of the present work.

As shown in FIG. 4, after generating a contention number at 31, a back-off is generated at 42 based on the contention number (e.g., inversely related to the contention number). At 43, the channel is sensed, and the coexistence beacon (e.g., a packet) is also decoded. If the channel is busy at 43, then it is determined at 44 whether the contention number (indicated by the packet decoded at 43) is larger than the contention number generated at 31. If yes at 44, then contention is discontinued at 45. If no at 44, then the back-off is frozen at 34, after which operation continues at 43.

If the channel is free at 43, then the back-off is decreased at 35, after which it is determined at 36 whether the back-off has reached 0. If no at 36, operation continues at 43. If yes at 36, a packet (coexistence beacon) is transmitted at 37. Thereafter, if a collision is detected at 38, operation returns to 42, where another back-off is generated based on the contention number generated at 31.

Advantages associated with the procedure shown in FIG. 4 include: (1) the CS with higher contention number (higher priority) will likely transmit the packet earlier, because it has a smaller size random back-off window; and (2) the CS will stop trying to transmit after it hears a higher contention number, so that the probability of collision is sharply decreased.

Figure 5:
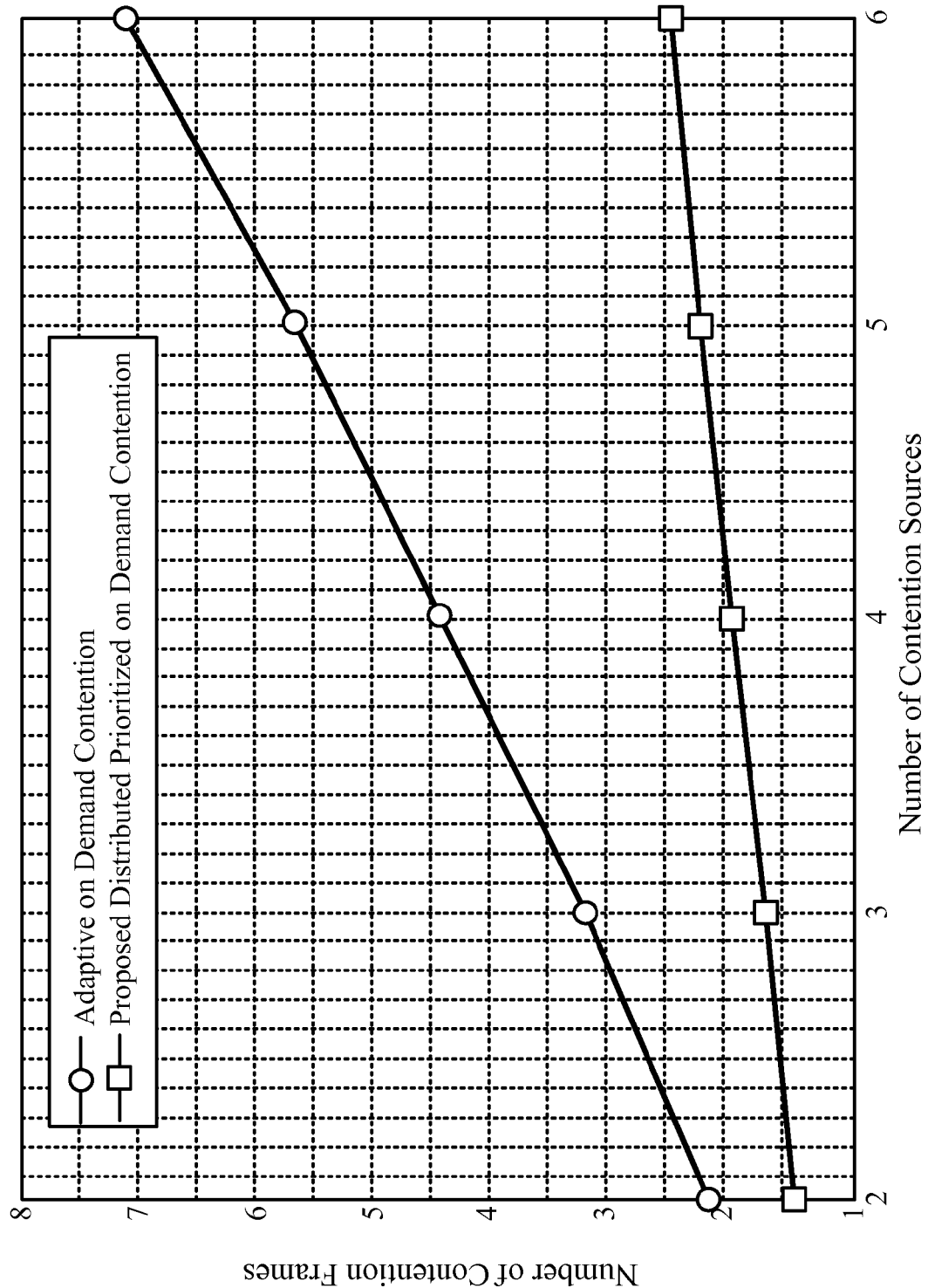
FIG. 5 shows a graphical comparison of the performances of spectrum contention procedures according to prior art and the present work.

FIG. 5 compares the performance of the prior art adaptive on demand contention protocol with embodiments of the present work for the following parameters: $CN_{max}=2^{20}$ and $RB_{max}=2^{4}$. As is clear from the results, the present work significantly reduces the number of contention frames required to decide on the winning WRAN. For example, for three WRANs, only 1.6 frames are required on the average with the present work, while the on-demand contention protocol requires around 3.2 frames, which means a 100% reduction using the present work. The gain increases with the number of CS's as shown in FIG. 5.

Figure 6:
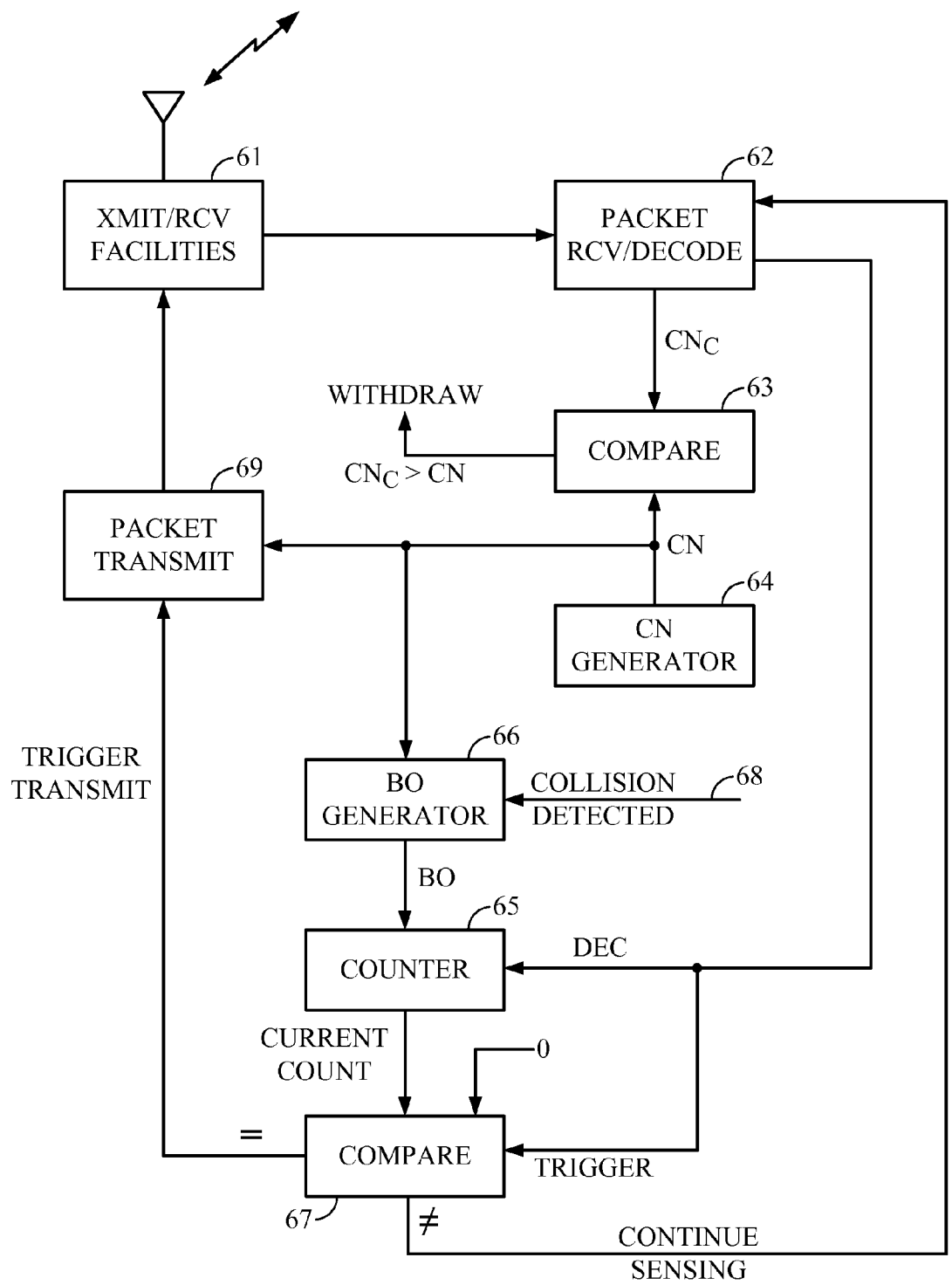
FIG. 6 illustrates a wireless communication apparatus according to exemplary embodiments of the present work.

FIG. 6 diagrammatically illustrates a wireless communication apparatus according to exemplary embodiments of the present work. In some embodiments, the apparatus of FIG. 6 is capable of performing operations shown in FIG. 4. In some embodiments, the apparatus of FIG. 6 is a base station. In some embodiments, the apparatus of FIG. 6 is customer premises equipment (CPE). Transmit/receive facilities 61 support bidirectional wireless communication with other wireless communication apparatus (e.g., base stations that control contended-for channels). A packet receive/decode unit 62 monitors the contention channel (e.g., during the SCW of FIG. 2) to determine whether another contender has transmitted a packet containing a contention number. If a contention number ($CN_c$ in FIG. 6) is decoded at 62, a compare unit 63 compares it to a contention number CN generated by a CN generator 64. The compare unit 63 thus functions as a determiner for determining whether the contention priority represented by $CN_c$ than the contention priority represented by CN. If $CN_c$>CN, the compare unit 63 produces a withdraw signal that causes the wireless communication apparatus to withdraw from contention for the channel.

If no contention number is decoded at 62, then the contention channel is considered to be free. In this case, a decrement (DEC) signal decrements the current count value of a counter 65. The initial count value of counter 65 has been loaded with a backoff value (BO) produced by a backoff generator 66 based on the contention number CN produced by the CN generator 64. A compare unit 67 (operation of which is triggered by the DEC signal in some embodiments) compares the current count value of counter 65 to 0. If the current count value reaches 0, the compare unit 67 triggers a packet transmit unit 69 to initiate transmission of a packet, including the contention number CN, on the contention channel (e.g., during SCW of FIG. 2). Otherwise, the compare unit 67 signals the monitor 62 to continue monitoring the contention channel. The counter 65 and compare unit 67 are thus seen to constitute logic for determining, based on BO, whether to transmit CN when the contention channel is free.

A value BO is generated at 66 upon initialization of the apparatus' contention for a channel. A new value BO is also generated when a collision is detected (see 68 in FIG. 6 and 38,42 in FIG. 4) in conjunction with the packet transmission at 69.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method of contending on a contention channel for transmission access to a portion of a television channel spectrum, comprising:

randomly selecting a contention value from a predetermined set of contention values;

defining a set of possible back-off values, including calculating one of said possible back-off values based on the selected contention value;

selecting a back-off value from the set of possible back-off values;

determining whether the contention channel is available for transmission of the selected contention value; and in response to a determination that the contention channel is available, using the selected back-off value to decide whether to transmit the selected contention value on the contention channel;

wherein the contention values represent contention priorities, wherein the selected back-off value is inversely related to the contention priority associated with the selected contention value, and wherein said using includes providing a relatively higher transmission priority to a selected contention value having a relatively lower associated back-off value.

2. The method of claim 1, wherein the contention values represent respective contention priorities, wherein said determining includes receiving one of said contention values transmitted on the contention channel by a contender for said portion, and further comprising determining whether a first contention priority represented by the received contention value is higher than a second contention priority represented by the selected contention value and, in response to a determination that the first contention priority is higher than the second contention priority, withdrawing from contention for said portion.

3. A method of contending on a contention channel for transmission access to a portion of a television channel spectrum, comprising:
  randomly selecting a contention value from a predetermined set of contention values;
  selecting a back-off value based on the selected contention value;
  determining whether the contention channel is available for transmission of the selected contention value; and
  in response to a determination that the contention channel is available, using the selected back-off value to decide whether to transmit the selected contention value on the contention channel;
  wherein the contention values represent respective contention priorities, wherein the selected back-off value is inversely related to the contention priority associated with the selected contention value, and wherein said using includes providing a relatively higher transmission priority to a selected contention value having a relatively lower associated back-off value.

4. The method of claim 3, wherein said using includes decreasing the selected backoff value to produce a decreased back-off value, and using the decreased backoff value to decide whether to transmit the selected contention value on the contention channel.

5. A wireless communication apparatus capable of contending on a contention channel for transmission access to a portion of a television channel spectrum, comprising:
  a contention value generator configured for randomly selecting a contention value from a predetermined set of contention values;
  a back-off value generator coupled to said contention value generator and configured for defining a set of possible back-off values, including calculating one of said possible back-off values based on the selected contention value, and configured for selecting a back-off value from said set of possible back-off values;
  a contention channel monitor configured to determine whether the contention channel is available for transmission of the selected contention value;
  logic coupled to said back-off value generator and said contention channel monitor, said logic configured for, in response to a determination that the contention channel is available, using the selected back-off value to decide whether to transmit the selected contention value on the contention channel; and
  wherein the contention values represent respective contention priorities, wherein the selected back-off value is inversely related to the contention priority associated with the selected contention value, and wherein said logic is configured to provide a relatively higher transmission priority to a selected contention value having a relatively lower associated back-off value.

6. The apparatus of claim 5, wherein said logic is configured for decreasing the selected back-off value to produce a decreased back-off value, and for using the decreased back-off value to decide whether to transmit the selected contention value on the contention channel.

7. The apparatus of claim 5, wherein the contention values represent respective contention priorities, wherein said contention channel monitor is configured to receive one of said contention values transmitted on the contention channel by a contender for said portion, and further comprising a determiner coupled to said contention channel monitor and said contention value generator for determining whether a first contention priority represented by the received contention value is higher than a second contention priority represented by the selected contention value and further for, in response to a determination that the first contention priority is higher than the second contention priority, directing withdrawal from contention for said portion.

8. An apparatus for contending on a contention channel for transmission access to a portion of a television channel spectrum, comprising:
  means for randomly selecting a contention value from a predetermined set of contention values;
  means for defining a set of possible back-off values, including means for calculating one of said possible back-off values based on the selected contention value;
  means for selecting a back-off value from said set of possible back-off values;
  means for determining whether the contention channel is available for transmission of the selected contention value; and
  means responsive to a determination that the contention channel is available for using the selected back-off value to decide whether to transmit the selected contention value on the contention channel;
  wherein the contention values represent respective contention priorities, wherein the selected back-off value is inversely related to the contention priority associated with the selected contention value, and wherein said means for using includes means for providing a relatively higher transmission priority to a selected contention value having a relatively lower associated back-off value.

9. The apparatus of claim 8, wherein said means for using includes means for decreasing the selected back-off value to produce a decreased back-off value, and means for using the decreased back-off value to decide whether to transmit the selected contention value on the contention channel.

10. The apparatus of claim 8, wherein the contention values represent respective contention priorities, wherein said means for determining includes means for receiving one of said contention values transmitted on the contention channel by a contender for said portion, and further comprising means for determining whether a first contention priority represented by the received contention value is higher than a second contention priority represented by the selected contention value and, in response to a determination that the first contention priority is higher than the second contention priority, for directing withdrawal from contention for said portion.

11. A computer program product that supports contending on a contention channel for transmission access to a portion of a television channel spectrum, comprising:
  a non-transitory computer readable medium comprising:
    code for causing at least one data processor to randomly select a contention value from a predetermined set of contention values;
    code for causing the at least one data processor to define a set of possible back-off values, including calculating one of said possible back-off values based on the selected contention value, code for causing the at least one data processor to select a back-off value from said set of possible back-off values;

code for causing the at least one data processor to determine whether the contention channel is available for transmission of the selected contention value; and code for causing the at least one data processor to, in response to a determination that the contention channel is available, use the selected back-off value to decide whether to transmit the selected contention value on the contention channel; and code for selecting wherein the contention values represent respective contention priorities, wherein the selected back-off value is inversely related to the contention priority associated with the selected contention value.

12. A wireless communication apparatus for participating as a contender on a contention channel for transmission access to a portion of a television channel spectrum, comprising:

a contention channel monitor configured to receive via the contention channel a contention signal transmitted on the contention channel by a further contender for said portion, wherein the contention signal is also received by a contention destination that uses the contention signal to decide which of the contenders receives transmission access;

a determiner coupled to said contention channel monitor and configured to determine in response to the received contention signal whether a contention priority of the further contender is higher than a contention priority of said contender;

said determiner further configured to direct said wireless communication apparatus to withdraw from contention for said portion in response to a determination that the further contender has a higher contention priority than said contender; and logic coupled to said contention channel monitor and configured for, in response to a determination that the contention channel is available, using a selected back-off value to decide whether to transmit a selected contention value on the contention channel.

13. An apparatus for participating as a contender contending on a contention channel for transmission access to a portion of a television channel spectrum, comprising:

means for receiving via the contention channel a contention signal transmitted on the contention channel by a further contender for said portion, wherein the contention signal is also received by a contention destination that uses the contention signal to decide which of the contenders receives transmission access;

means for determining in response to the received contention signal whether a contention priority of the further contender is higher than a contention priority of said contender;

means responsive to a determination that the further contender has a higher contention priority than said contender for directing said apparatus to withdraw from contention for said portion; and means responsive to a determination that the contention channel is available for using a selected back-off value to decide whether to transmit a selected contention value on the contention channel.

14. A computer program product that supports a contender contending on a contention channel for transmission access to a portion of a television channel spectrum, comprising:

a non-transitory computer readable medium comprising:

code for causing at least one data processor to receive via the contention channel a contention signal transmitted on the contention channel by a further contender for said portion, wherein the contention signal is also received by a contention destination that uses the contention signal to decide which of the contenders receives transmission access;

code for causing the at least one data processor to determine in response to the received contention signal whether a contention priority of the further contender is higher than a contention priority of said contender;

code for causing the at least one data processor to direct said contender to withdraw from contention for said portion in response to a determination that the further contender has a higher contention priority than said contender; and code for causing the at least one data processor to, in response to a determination that the contention channel is available, use a selected back-off value to decide whether to transmit a selected contention value on the contention channel.

* * * * *